(12) United States Patent
Pionetti et al.

(10) Patent No.: US 8,888,412 B2
(45) Date of Patent: Nov. 18, 2014

(54) SEABED-TO-SURFACE LINKING EQUIPMENT INCLUDING A FLEXIBLE PIPE GUIDING STRUCTURE

(75) Inventors: François-Régis Pionetti, La Baleine (FR); Damien Szyszka, Issy les Moulineaux (FR); Rami Chkir, Puteaux (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 13/697,953

(22) PCT Filed: May 18, 2011

(86) PCT No.: PCT/FR2011/051118
§ 371 (c)(1),
(2), (4) Date: Nov. 14, 2012

(87) PCT Pub. No.: WO2011/144864
PCT Pub. Date: Nov. 24, 2011

(65) Prior Publication Data
US 2013/0064606 A1    Mar. 14, 2013

(30) Foreign Application Priority Data
May 20, 2010    (FR) ..................................... 10 53909

(51) Int. Cl.
| E21B 17/01 | (2006.01) |
| --- | --- |
| B63B 21/50 | (2006.01) |
| F16L 1/16 | (2006.01) |
| E21B 43/01 | (2006.01) |
| B63B 22/02 | (2006.01) |

(52) U.S. Cl.
CPC . *F16L 1/16* (2013.01); *B63B 21/50* (2013.01); *E21B 43/0107* (2013.01); *B63B 22/021* (2013.01); *B63B 21/508* (2013.01); *E21B 17/01* (2013.01)

USPC ................. 405/224.2; 405/169; 405/224.3; 166/350

(58) Field of Classification Search
USPC ........ 405/158, 168.1, 168.4, 171, 172, 184.4, 405/224, 224.3; 166/350, 352, 367
See application file for complete search history.

(56) References Cited

U.S. PATENT DOCUMENTS

| 4,423,984 A | * | 1/1984 | Panicker et al. ........... 405/224.3 |
| 4,470,722 A | | 9/1984 | Gregory |

(Continued)

FOREIGN PATENT DOCUMENTS

| WO | WO 2009/122098 | 10/2009 |
| WO | WO 2009/150142 | 12/2009 |

*Primary Examiner* — Benjamin Fiorello
(74) *Attorney, Agent, or Firm* — Cozen O'Connor (57) ABSTRACT

A bottom-to-surface connection installation between a plurality of undersea pipes resting on the sea bottom and a floating support on the surface and anchored to the sea bottom, the floating support including a turret; and a plurality of flexible hoses extending from the turret to respective ones of a plurality of rigid pipes, the rigid pipes providing connections between the flexible hoses and respective ones of the plurality of undersea pipes resting on the sea bottom, wherein the installation includes a guide structure maintained in the subsurface between the turret and the top of the rigid pipes, the guide structure being suitable for guiding the flexible hoses, the guide structure having a plurality of first guide elements with respective ones of the plurality of flexible hoses passing therethrough in such a manner that the flexible hose has at least a bottom flexible hose portion in a dipping catenary configuration, and a second flexible hose portion extending entirely above the point of contact between the flexible hose and the first guide element, this portion occupying a curve of catenary shape between the guide element through which it passes and the turret to which its top end is connected.

15 Claims, 6 Drawing Sheets

(56) References Cited

U.S. PATENT DOCUMENTS

| | | | |
|---|---|---|---|
| 4,848,949 A | * | 7/1989 | Castel .............................. 403/12 |
| 5,297,632 A | * | 3/1994 | Blandford ..................... 166/344 |
| 2006/0131027 A1 | * | 6/2006 | Chiesa et al. ................. 166/367 |
| 2007/0196182 A1 | * | 8/2007 | Ellis ........................... 405/224.4 |
| 2011/0110724 A1 | * | 5/2011 | Baylot et al. .................. 405/224 |

* cited by examiner

SEABED-TO-SURFACE LINKING EQUIPMENT INCLUDING A FLEXIBLE PIPE GUIDING STRUCTURE

RELATED APPLICATIONS

This is a U.S. national stage of application No. PCT/FR2011/051118, filed on May 18, 2011. Priority is claimed on the following application: French Application No.: 1053909 filed on May 20, 2010, the disclosure contents of which are hereby incorporated by reference.

FIELD OF THE INVENTION

The present invention relates to a bottom-to-surface connection installation between a plurality of undersea pipes resting on the sea bottom and a floating support on the surface, the installation comprising a hybrid tower constituted by a plurality of flexible hoses connected to rigid riser pipes, the top ends of said hoses being secured to a turret that pivots freely at the front of the ship or within the ship, generally in the front third of said ship.

The technical sector of the invention is more particularly the field of fabricating and installing production risers for off-shore extraction of oil, gas, or other soluble or fusible material or a suspension of mineral material from an undersea well head to a floating support, in order to develop production fields located at sea, at a distance from the coast. The main and immediate application of the invention lies in the field of oil production.

BACKGROUND OF THE INVENTION

In general, a floating support has anchor means to enable it to remain in position in spite of the effects of current, wind, and swell. It generally also includes means for storing and processing oil and off-loading means for use with off-loading tankers, where such tankers call at regular intervals to remove the production. Such floating supports are commonly referred to as floating production storage off-loading (FPSO) units.

Floating supports are:
either of constant heading type, i.e. they possess a plurality of anchors, generally situated at each of the corners of said floating support and serving to keep it on a heading that cannot vary, leaving it free to move only in roll and in pitching and limiting any movement in surge and yaw;
or else of the turret type, i.e. all of the anchors converge on a cylindrical structure secured to the ship, but free to rotate about a vertical axis ZZ', thus leaving the floating support free to turn around said turret and position itself in the direction of least resistance for the resultant of the effects of wind, current, and swell on the floating support and its super-structures.

Constant-heading type floating supports are intended for use more particularly in environments that are not too rough and that present swell of medium amplitude coming from a single direction, as applies in West Africa. The floating support is then installed facing the prevailing swell direction in order to minimize its effects. That type of floating support presents the advantage of enabling a very large number of bottom-to-surface connections to be installed simply over one side of said floating support, or indeed over both its starboard and port sides.

However, when conditions are more severe, or indeed extreme as in the North Sea, WO 2009/150142 proposes a constant-heading type floating support, namely a platform of the spar type having a bottom structure that is disconnectable to which the top ends of hoses are connected that provide bottom-to-surface connection. However, for those extreme conditions, an advantageous floating support is then of the turret type, with all of the bottom-to-surface connections converging on a turret prior to extending to the FPSO proper, via a swivel joint connection situated on the axis of said turret. In general, the bottom-to-surface connection pipes are constituted by flexible hoses directly connecting pipes resting on the sea bottom to the turret, said hoses generally being organized radially or in a star configuration so as to be uniformly distributed around the axis of said turret.

Numerous configurations have been developed, and reference may be made to patent WO 2009/122098 in the name of the Applicant which describes an FPSO fitted with such a turret and associated flexible hoses, more particularly for use in the extreme conditions that are to be encountered in the Arctic. Such a configuration is advantageous for medium depths of water, i.e. lying in the range 100 meters (m) to 350 m, or indeed in the range 500 m to 600 m. In particular, using hoses over the full depth of the body of water between the rigid pipes resting on the sea bottom and the floating support allows the floating supports to move more than would be possible if rigid pipes were used. Nevertheless, with that type of bottom-to-surface connection between the turret of a floating support and pipes resting on the sea bottom, it is not possible to use said hoses in a dipping catenary configuration, i.e. with a low point of inflection as described for hybrid tower type bottom-to-surface connections that comprise:

a vertical riser having its bottom end anchored to the sea bottom via a flexible hinge and connected to a said pipe resting on the sea bottom, and having its top end connected to a float immersed in the subsurface and serving to tension the riser; and a connecting flexible hose between the top end of said riser and a floating support on the surface, said connecting flexible hose possibly taking up under the effect of its own weight the shape of a dipping catenary curve, i.e. a curve that goes down well below the float and subsequently rises up to said floating support, which dipping catenary is capable of accommodating large amounts of movement of the floating support, with this being absorbed by deformation of the flexible hose, in particular by raising or lowering said low point of inflection of the dipping catenary.

However, as soon as the water reaches a depth lying in the range 1000 m to 1500 m, or indeed 2000 m to 3000 m, the cost of such a multitude of flexible hoses becomes very high because of the developed length of each of said hoses, since hoses are very complex and very difficult to fabricate if they are to achieve the levels of safety in operation that are required to enable them to remain in operation over periods of time that may reach or exceed 20 years to 25 years, or even more.

In particular, the hoses run the risk of interfering with one another and of banging against one another.

SUMMARY OF THE INVENTION

An object of the present invention is to provide a novel way of installing a bottom-to-surface connection between a floating support fitted with a turret to which flexible hoses are fastened and moored in order to provide at least a portion of the connection between the floating support and pipes resting on the sea bottom.

More precisely, an object of the present invention is to provide a novel type of bottom-to-surface connection that is simultaneously more compact and mechanically more reliable in terms of lifetime, while also being less expensive and simpler to make.

To do this, the present invention provides a bottom-to-surface connection installation between a plurality of undersea pipes resting on the sea bottom and a floating support at the surface and anchored to the sea bottom, the installation comprising:

a) a said floating support including a turret having a cavity within a structure offset at the front of the floating support or incorporated in or beneath the hull of the floating support, said cavity preferably passing through the hull of the floating support over its entire height, said turret further including a cylindrical internal portion suitable for remaining substantially stationary relative to the sea bottom inside said cavity when said floating support is caused to turn about the vertical axis ZZ' of said internal portion or of said cavity of the turret, said floating support being anchored to the sea bottom via lines that are fastened at their top ends to said cylindrical internal portion of the turret; and b) a plurality of flexible hoses extending from said turret to which their top ends are connected to the top ends of respective ones of a plurality of rigid pipes to which the bottom ends of said flexible hoses are connected, said rigid pipes providing connections between said flexible hoses and respective ones of said plurality of undersea pipes resting on the sea bottom, said rigid pipes being connected to one another and/or guided at least at their tops by a carrier structure that is tensioned by buoyancy elements, said carrier structure being connected to a base unit resting on or embedded in the sea bottom, the connection preferably being via a flexible mechanical hinge, and said carrier structure preferably including a vertical tension leg extending to said flexible mechanical hinge;

said installation being characterized in that it includes a guide structure maintained in the subsurface H between said turret and said carrier structure, preferably secured to said carrier structure at the top of said rigid pipes, said guide structure being suitable for guiding said flexible hoses between their top ends connected to said cylindrical internal portion of the turret and their bottom ends connected to the top ends of said rigid pipes, preferably via swan-neck devices, said guide structure having a plurality of first guide elements having respective ones of said plurality of flexible hoses passing respectively therethrough in such a manner that each said flexible hose has at least a first flexible hose portion in a dipping catenary configuration with a low point of inflection intermediate between the bottom end of said flexible hoses connected to the top end of a said rigid pipe and the point of contact between said flexible hose and said first guide element through which it passes, and a second flexible hose portion extending entirely above said point of contact of said flexible hose with said first guide element, following a catenary-shaped curve from said guide element through which it passes to said turret to which its top end is connected.

The guide structure of the invention makes it possible to create a plurality of dipping catenaries that extend (in the middles of the hoses) in planes that are substantially vertical, each containing the vertical axis $Z_1Z_1'$ of said guide structure, and preferably, where appropriate, in the same planes as the planes of said swan-neck type devices, with said dipping catenaries being spaced apart from one another in a perpendicular horizontal plane in such a manner as to create a minimum dihedral angle between two adjacent substantially vertical planes in which the axes of said dipping catenaries extend.

Said dipping catenaries of said flexible hose portions constitute a reserve of flexibility making controlled deformation possible that can be tolerated by said flexible hoses when they are deformed as a result of the floating support moving. Furthermore, the guide structure makes it possible to guarantee that the curvature of each of said dipping catenaries at its low point of inflection always remains with a radius of curvature that is greater than a minimum radius of curvature beneath which the deformation of the flexible hose would become irreversible and/or would damage it.

This advantageous technical effect of said guide structure is very important when using flexible hoses, since it is the weak points of the hoses that determine the lifetime of the installation, which weak points are situated essentially in the region of said low points of said dipping catenaries where the radius of curvature is at a minimum.

In all, the guide structure of the invention makes it possible to deploy a greater number of flexible hoses in an optimized compact space without them interfering with one another and in particular without them banging against one another in the event of said floating support moving as a result of swell, current, and/or waves.

It can be understood that the vertical axis ZZ' of said cylindrical internal structure of the turret and the vertical axis of said turret cavity coincide.

Furthermore, and in known manner, said internal cylindrical structure of the turret is mounted to turn inside said cavity relative to said structure cantilevered out at the front of the support and/or relative to the hull of said floating support by means of at least one rolling bearing or smooth bearing situated above the waterline and/or out to the water, preferably a rolling bearing, so as to allow said floating support to turn about said substantially vertical axis ZZ' of the turret without causing said internal cylindrical structure of the turret to turn.

In known manner, said internal cylindrical structure of the turret is a watertight tubular structure having a bottom wall assembled in watertight manner to the bottom end of the tubular side wall of said internal cylindrical structure of the turret, and second pipes provide connections between the top ends of said flexible hoses at the bottom wall of said pivoting internal structure of the turret and the deck of the floating support, rising within said internal structure of the turret and said cavity to a coupling of the swivel joint type that is secured to said floating support.

The so-called "dipping catenary" configuration of the first flexible hose portion is well known to the person skilled in the art and described in prior patent applications in the name of the Applicant. It is made up of two catenary curves of similar curvature arranged symmetrically about a vertical axis $Z_0Z_0'$ and on either side of a vertical plane of symmetry $P_0$ passing through said low point.

It can be understood that, when the installation is at rest, said second flexible hose portions depart further and further from the vertical axis of the turret and of said guide structure that is in alignment with the axis of the turret on going from their top ends connected to said turret down to said guide elements through which each of the flexible hoses pass, whereas in contrast, said first flexible hose portions come closer and closer to the axis of said carrier structure and the top ends of said rigid pipes on going from said guide elements to said top ends of said rigid pipes to which they are connected.

More particularly, said guide structure preferably has at least four, more preferably six to twelve of said first guide elements that are distributed, preferably symmetrically and regularly, more preferably circularly, at the periphery of said guide structure, having axes $Z_3Z_3'$ situated at a distance R1 of at least 3 m, and preferably lying in the range 3 m to 25 m from the axis $Z_1Z_1'$ of said guide structure.

It can be understood that the axis $Z_1Z_1'$ of the guide structure and the axis of the carrier structure are substantially in alignment with each other and with the axis $ZZ'$ of the turret when the installation is at rest.

According to an advantageous characteristic, said guide structure includes at least one buoyancy element suitable for keeping said guide structure above said carrier structure of the rigid pipes, at a depth H of at least 25 m, and preferably lying in the range 50 m to 250 m from the surface.

It can be understood that said buoyancy element exerts tension that is substantially vertical, and thus substantially on the axis of said guide structure when the installation is at rest.

Said buoyancy element of the guide structure is particularly advantageous in that it makes it possible to contribute to the operation of said carrier structure and to the tensioning and thus to the stiffening of its connection with the base unit at the sea bottom, and also in that it makes it easier to put said guide structure into place and to connect it with said carrier structure and rigid pipes during the method of putting the installation into place.

Still more particularly, said buoyancy element is constituted by at least one drum for which it is possible to vary its tensioning force by ballasting or deballasting said drum.

It can be understood that by acting on the buoyancy of said drum, which is deballasted using known means, it is possible to increase (deballast) or reduce (ballast) the tensioning of said carrier structure and the stiffness of its connection with the base unit at the sea bottom.

Advantageously, said guide structure is connected to said carrier structure by a connection constituting a flexible mechanical hinge between said guide structure and said carrier structure.

Also advantageously, said guide structure includes at least one first stage $P_1$ of said first guide elements situated at a depth H1 and at least one second stage $P_2$ of second guide elements situated above said first guide elements at a depth H2 less than the depth H1 of said first guide elements, and through which said second flexible hose portions pass, the axis $Z_4Z_4'$ of each said second guide element being positioned substantially in the same vertical plane as the axis $Z_3Z_3'$ of said first guide element above which said second guide element is situated and through which the same flexible hose passes, but at a distance R2 closer to the axis $Z_1Z_1'$ of said guide structure than said axis $Z_3Z_3'$ of said first guide element.

This configuration in at least two stages for distributing said first and second guide elements presents the advantage of considerably improving the guidance of said flexible hoses, in particular by avoiding risks of the flexible hoses being damaged by a flexible hose jamming in a said first or second guide element, thereby creating excessive curvature and/or axial compression, with this phenomenon being particularly feared and dangerous in said first guide element, particularly in the event of a storm and/or severe weather and sea conditions.

Thus, this characteristic seeks to guarantee the integrity of the flexible hoses, in particular in terms of pressure so as to prevent them from bursting, which would destroy the installation and could potentially lead to considerable amounts of pollution.

In a preferred embodiment of the invention, said guide structure is connected to said turret by at least one connection and tensioning cable.

The term "tensioning cable" is used herein to mean a cable under tension in which the tension acts substantially along the axis of the guide structure in the absence of any other stress.

It may also comprise a plurality of cables or a cable in combination with a plurality of slings, preferably three slings in a Y configuration, with their fastening points arranged uniformly around the axis of the guide structure, and with the suspension point of the Y configuration being connected to the bottom end of said tensioning cable so that the tension that results from the cable(s) or the slings acts substantially on the axis of the guide structure in the absence of any other stress.

Using such a tensioning cable seeks to minimize deformations to the dipping catenaries of the flexible hoses as a result of moving the top end of the tower constituted by the assembly of said carrier structure and said rigid pipes during extreme movements of the floating support under the effect of swell, wind, or current, which could otherwise force the tower to tilt in a manner that is substantially proportional to the movement of said floating support in horizontal translation relative to the vertical passing through said base unit.

Limiting deformation to the dipping catenaries serves to reduce the differences in height between their various low points of inflection in the event of the floating support moving.

In another embodiment, the guide structure is embedded in the top of the tower and thus runs on continuously with the top of the tower.

More particularly, said tensioning cable is tensioned in such a manner that the angle $\alpha$ between the axis $Z_2Z_2'$ of said tensioning cable and the axis $Z_1Z_1'$ of said carrier structure, and preferably of said tension leg, remains less than 5°, said floating support being anchored to the sea bottom in such a manner that the angle of inclination $\beta$ between the axis $Z_1Z_1'$ of said carrier structure, and preferably of said vertical tension leg, and the vertical $Z_0Z_0'$ passing through said base unit remains less than 10° when the floating support is moved by rough water and/or wind force in spite of being anchored.

In a variant embodiment, said tensioning cable passes through said turret preferably substantially on the axis $ZZ'$ of said turret, and is then bent over pulleys secured to said turret and/or to the structure of the floating support, preferably the deck of the floating support, prior to being tensioned at its free end by a counterweight moving parallel to the axis $ZZ'$ of said turret in a guide wall inside said turret or respectively inside the hull of said floating support.

In this embodiment, it suffices to modify the weight of said counterweight in order to modify said tensioning, which is relatively simple and requires a minimum amount of maintenance.

In another variant embodiment, said cable is tensioned using a hydraulic tensioner secured to the turret or to the deck of the floating support, said hydraulic tensioner including at least one hydraulic actuator co-operating with a reeving of pulleys, the end of said tensioning cable being fastened to a stationary point secured to the support of said hydraulic actuator, and a hydraulic unit constituted by accumulators and pumps suitable for maintaining a substantially constant given pressure in said actuator enabling a substantially constant given tension to be imparted to said tensioning cable.

This way of tensioning the tensioning cable is more complex than using a counterweight, but it presents the advantage of making it possible for the tensioning to be adjusted in real time, merely by changing the setpoint for the pressure within the accumulators, which can be done at greater speed under severe weather and sea conditions that might possibly require fine adjustment of the tensioning of said tensioning cable in order to minimize the constraints inflicted on the hoses.

Also preferably, said tensioning cable co-operates with a swivel connection on the path of the cable, preferably inside the turret, in such a manner that the bottom portion of the cable beneath said swivel connection remains without twisting, while the top portion of said tensioning cable follows the relative turning movements of said floating support about said internal cylindrical portion of the turret.

According to another particular characteristic, the installation includes a mooring structure fastened, preferably in reversible manner, to the underface of the bottom wall of said internal cylindrical portion of the turret, said flexible hoses being moored to said mooring structure at their said top ends and said floating support being anchored to the sea bottom by anchor lines moored to said mooring structure, preferably a plurality of second connection pipes extending through said turret between the top ends of said flexible hoses and the deck of the floating support, passing through the bottom wall of the internal cylindrical portion of the turret and rising to a coupling, preferably of the swivel joint type, having said second connection pipes connected thereto, said coupling being secured to the floating support, preferably via the deck of the floating support.

Said mooring structure may be connected and/or disconnected quickly relative to the turret, said mooring structure preferably presenting buoyancy elements so as to remain in the subsurface when said mooring structure is disconnected from the turret, which is something that it is advantageous to do in the event of a violent storm giving rise to movements of the floating support that are too great in spite of using an installation of the invention as described above.

In a particular embodiment, the installation comprises a multi-riser hybrid tower comprising:

a) a vertical tension leg suspended from at least one float immersed in the subsurface, preferably via a chain or cable, said tension leg being fastened at its bottom end, preferably via a flexible mechanical hinge, to a base unit resting on the sea bottom and/or embedded in the sea bottom; and b) a plurality of rigid vertical pipes referred to as "risers", having their bottom ends connected via junction bend pipe elements and automatic connectors to a plurality of said pipes resting on the sea bottom; and c) a plurality of buoyancy and guide modules supported by said tension leg, said buoyancy and guide modules supporting buoyancy elements and guiding said risers in position, preferably in a regularly and symmetrically distributed arrangement around said tension leg, said buoyancy and guide modules preferably constituting a plurality of independent structures suitable for sliding along said tension leg and along said risers, said structure supporting buoyancy elements and guiding said risers in position, preferably in a regular and symmetrical distribution around said tension leg.

In particular, it is possible to make use of buoyancy modules of the kind described in WO 2006/136960 and FR 09/51218 filed on Feb. 26, 2009, in the name of the Applicant.

In WO 00/49267 in the name of the Applicant, a multiple hybrid tower is described that has an anchor system with a vertical tension leg constituted either by a cable or by a metal bar, or indeed by a pipe that is tensioned at its top end by a float. The bottom end of the tension leg is fastened to a base unit resting on the sea bottom. Said tension leg has guide means distributed all along its length with a plurality of said vertical risers passing therethrough. Said base unit may merely be placed on the sea bottom, staying in place under the effect of its own weight, or it may be anchored by means of piles or any other device suitable for holding it in place. In WO 00/49267, the bottom end of the vertical riser is suitable for being connected to the end of a bent sleeve that is movable between a high position and a low position relative to said base unit, from which the sleeve is suspended and with which it is associated by return means urging it towards a high position in the absence of a riser. This movability of the bent sleeve serves to absorb variations in the length of the riser under the effects of the temperature and the pressure of the fluid it conveys. At the head of the vertical riser, an abutment device that is secured thereto comes to bear against the support guide installed at the head of the float, thereby keeping the entire riser in suspension.

The connection with the undersea pipe resting on the sea bottom generally takes place via a length of pipe that is pigtail-shaped or S-shaped, said S-shape then lying in a plane that is either vertical or horizontal, the connection with said undersea pipe generally taking place via an automatic connector.

The vertical tension leg is connected at its bottom end to the base unit via a flexible hinge of the laminated abutment type as sold by the supplier Techlam France, or of the Roto-Latch® type available from Oilstates USA, and known to the person skilled in the art.

That embodiment having a multitude of risers held in a central structure having guide means is advantageous when it is possible to prefabricate the entire tower on land prior to towing it out to sea, and then once on site, up-ending it for its final positioning.

For this purpose, the technique used is similar to that described in WO 2006/136960 and WO 2008/056185, and it consists in suspending the top ends of the pipes from a top carrier structure and in securing a plurality of buoyancy modules or of insulation-and-buoyancy modules to the central tension leg via a plurality of structural elements secured to the tension leg and thus serving to guide the various vertical pipes, thereby enabling them to lengthen freely downwards when they are under pressure and/or subjected to a high temperature (crude oil coming from wells).

The various structural elements and buoyancy elements are regularly spaced apart along the entire length of the vertical tension leg, thereby enabling the tower to be towed at sea, since the tower floats as a result of its buoyancy elements distributed in this way along its entire length.

The present invention also provides a method of towing a tower at sea and putting into place an installation of the invention, the method being characterized in that it comprises the following successive steps:

1) prefabricating a said tower on land; and 2) towing said tower at sea while in the horizontal position and using a laying ship, said tower floating at the surface because of said buoyancy elements distributed along said tower; and 3) installing a deadman at the bottom end of said tower; and 4) up-ending said tower and connecting its bottom end to said flexible mechanical hinge at said base unit; and 5) lowering said guide structure from the laying ship (11) and connecting it to the top of said tower; and 6) preferably deballasting a buoyancy drum of said guide structure and then disconnecting the cable for lowering said guide structure, such that said guide structure then remains as a result of its own buoyancy in a position substantially vertically above said tower; and 7) moving away the laying ship and moving the floating support on the surface until it comes up to said guide structure, and then anchoring the floating support to the sea bottom using anchor lines; and 8) preferably installing a connection and tensioning cable between the floating support and the guide structure, and tensioning said cable to maintain said guide structure and said tower that is connected thereto in a configuration that is sufficiently stiff to enable said flexible hoses to be subsequently put into place; and 9) bringing up the laying ship and lowering each bottom end of a flexible hose in register with and through a respective one of said guide elements, and then connecting the bottom ends of the flexible hoses to the top ends of corresponding ones of said risers; and then 10) connecting the bottom ends of the risers with the ends of the pipes resting on the sea bottom.

BRIEF DESCRIPTION OF THE DRAWINGS

Other characteristics and advantages of the present invention appear better in the light of the following detailed description given by way of non-limiting illustration and with reference to the drawings, in which.

DETAILED DESCRIPTION OF THE PRESENTLY PREFERRED EMBODIMENTS

Figure 1:
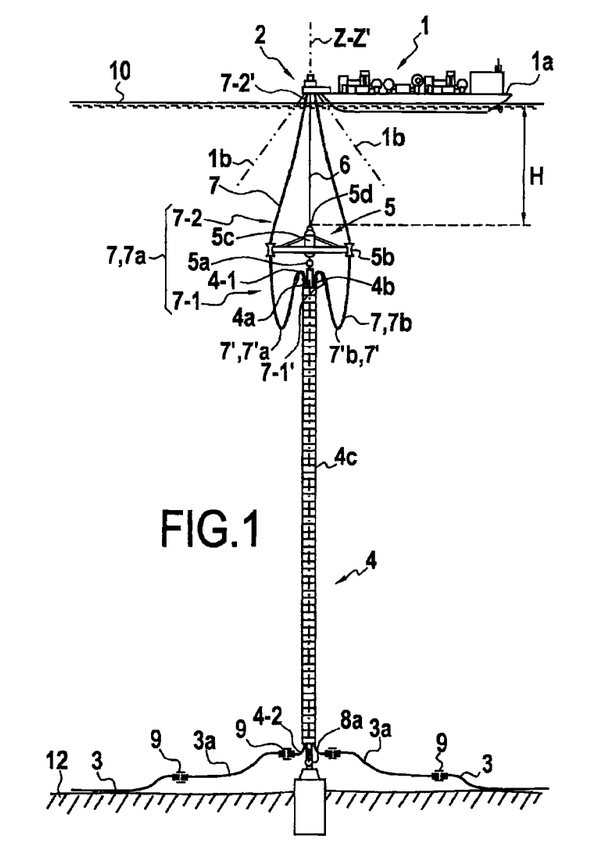
FIG. 1 is a side view of a bottom-to-surface connection of the invention connected to an FPSO 1 having a turret 2 cantilevered out from the front, the assembly being at rest, in a substantially vertical configuration.
Figures 7A, 7B:
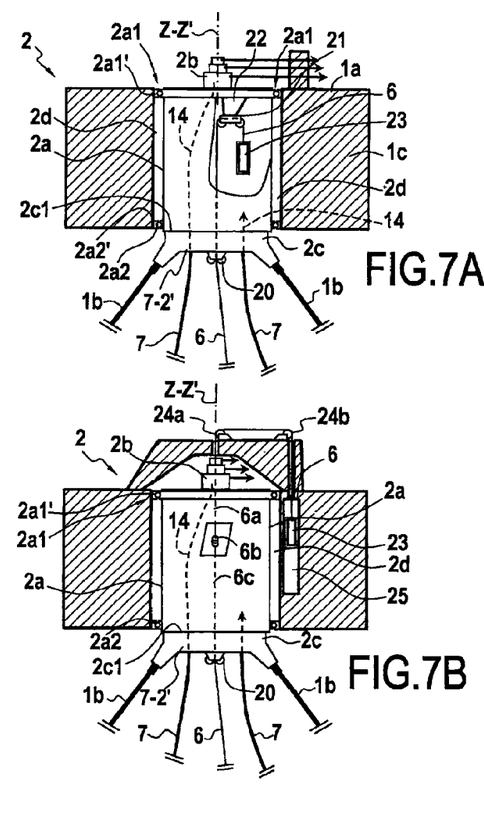
FIG. 7A is a cut-away side view showing in detail first means for tensioning the tensioning and connection cable 6 leading to the top of the tower 4, and making use of a counterweight 23, said counterweight being situated inside the structure of the turret.
FIG. 7B shows a variant of FIG. 7A in which the counterweight 23 is situated outside the turret, and inside the structure of the FPSO.

FIG. 1 is a side view of a floating support 1 of the FPSO type secured to a turret 2 cantilevered out from the front of said FPSO, said turret being anchored via a plurality of anchor lines 1b connected to anchors (not shown) embedded in the sea bed 12. Such a turret, known to the person skilled in the art, is shown in FIGS. 7A and 7B, and presents a central cylindrical portion 2a that is substantially stationary in rotation relative to the sea bed 12 inside a cavity 2d that passes through the hull 1c of the floating support 1. Said central cylindrical portion 2a and the hull 1c co-operate in relative rotation via top and bottom rolling bearings 2a1 and 2a2, with the outside portions 2a' thereof being secured to the hull 1c and/or to the deck 1a of the floating support 1. This allows the FPSO to pivot freely about a vertical axis ZZ' of the turret and to take up position in a direction corresponding to the resultant of the forces generated by swell, wind, and current on the FPSO and its super-structures, without the central cylindrical portion 2a of the turret 2 pivoting significantly.

The vertical axis ZZ' corresponds to the axis of the cavity 2d and of the central cylindrical portion 2a of the above-described turret 2.

At rest, the axis ZZ' of the turret 2 is situated vertically on the axis $Z_0Z_0'$ of the base unit 8 of a multi-riser hybrid tower 4. The tower 4 has a plurality of vertical rigid pipes or "risers" made of steel 4a that are organized as a bundle around a central tension leg 4b connected to said base unit 8 via a mechanical hinge, preferably a flexible joint hinge 8a. Buoyancy elements 4c are distributed along the tower 4 giving the assembly positive buoyancy, thus enabling the tower 4 to be tensioned vertically, however its axis $Z_1Z_1'$ can nevertheless adopt an angle of inclination β relative to the vertical $Z_0Z_0'$ that may be as much as 10° to 15°, at most, when the floating support is subjected to extreme movements due to wind, swell, or current. The value of the angle β depends on the stiffness of the anchoring 1b of the FPSO. Each of the rigid pipes 4a is fitted at its head with a so-called "swan neck" device 4-1 providing a connection with the end of a flexible hose 7. Each of said rigid pipes 4a is fitted at its bottom end with a bend, in particular a bent pipe element 4-2 having the male/female portion of a connector 9 installed at the end thereof for co-operating with the female/male portion of said automatic connector 9 that is secured to a junction part 5a, likewise constituted by a pipe element including a plurality of bends and serving in known manner to make a connection with a pipe 3 resting on the sea bottom 12. The buoyancy elements 4c that are distributed along the tower 4 and that impart positive buoyancy to the assembly, also make it possible to tow the assembly to its site and to perform the initial stages of putting the installation to place in accordance with the invention and under excellent safety conditions, as explained in greater detail with reference to FIG. 3.

A guide structure 5 is installed at the top of the tower 4, which structure is connected to said top of the tower via a flexible mechanical hinge 5a of the chain type, and to the turret 2 by a tensioning cable 6 that is connected at 5d to said structure 5, e.g. at the top of a buoyancy drum 5c axially incorporated in the guide structure 5 and placed in alignment $Z_1Z_1'$ with the tower 4. In the event of the FPSO 1 moving, an angle of inclination a may be created between the axis $Z_2Z_2'$ of the tensioning cable 6 connected to the turret 2 of the surface and the axis $Z_1Z_1'$ of the tower 4 and corresponding substantially to the axis of the guide structure 5. A plurality of guide elements 5b are circularly distributed, preferably regularly distributed, at the periphery 5-1 of said guide structure 5, each of them receiving, i.e. having passing therethrough, a flexible hose 7 connected at its bottom end 7-1' to the swan-neck device 4-1, and at its top end 7-2' to the mooring structure 2c attached to the bottom wall 2c-1 of said cylindrical central portion 2a that constitutes the inner portion of the turret 2. The virtual center line of each of the flexible hoses 7 is situated substantially in the same plane as the vertical axial plane of said swan neck 4-1, which vertical axial plane also includes the vertical axes $Z_3Z_3'$ and $Z_4Z_4'$ of the guide elements 5b and 5b'. The swan necks and flexible hoses 7 are connected to a swivel joint coupling 2b on the deck 1a via second pipes 14 passing through the cylindrical central internal portion 2a of the turret 2, in known manner.

Figures 9A, 9B, 10:
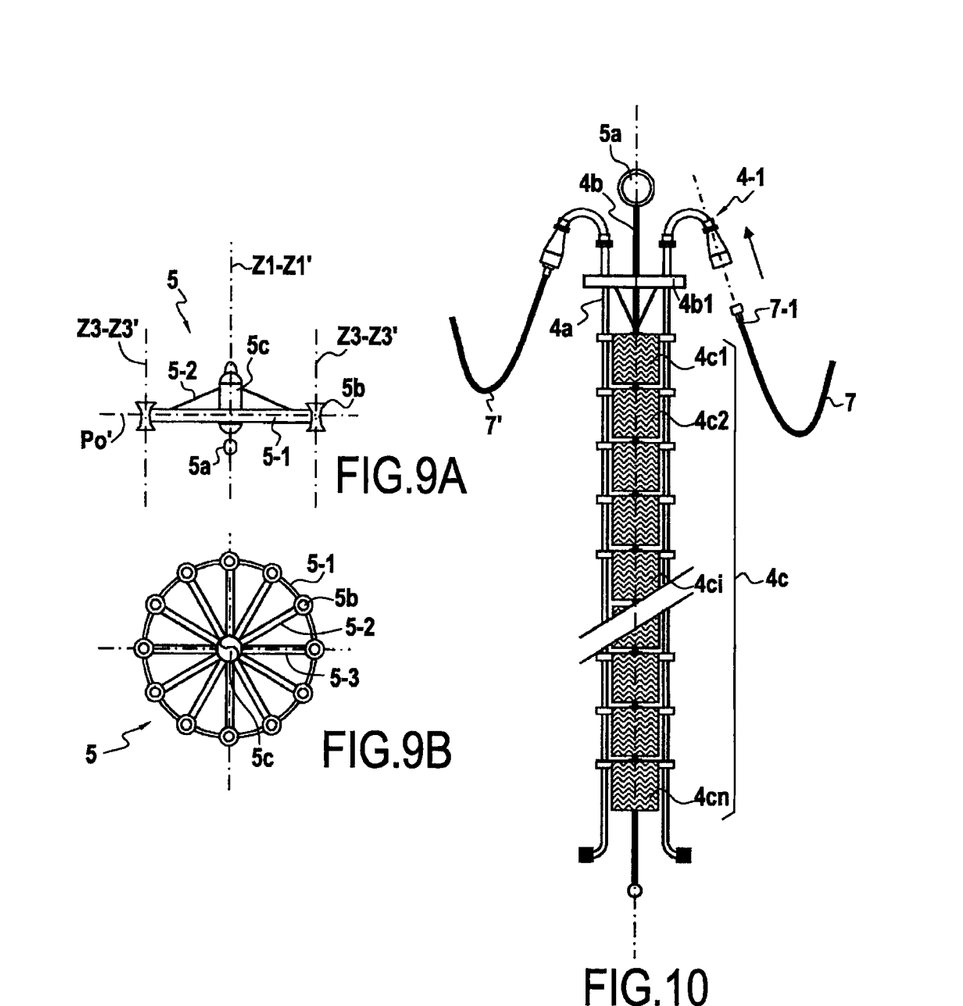
FIG. 9A is a vertical mid-section view of a guide structure 5.
FIG. 9B is a plan view of a FIG. 9A guide structure having twelve guide elements 5b distributed circularly and regularly around the periphery 5-1 of the guide structure 5.
FIG. 10 is a diagrammatic view of a tower fitted with buoyancy and guide modules $4c_i$.

In FIGS. 9A and 9B, the guide elements 5b are twelve in number and they are disposed regularly, symmetrically, and circularly around a central axial drum 5c, said guide elements 5b being supported by structural elements 5-2 arranged radially and providing connections between the guide elements 5b and the drum 5c, and also by peripheral structural elements 5-1 providing junctions between successive pairs of guide elements 5b at the periphery of the guide structure 5. The flexible hose 7 adopts curves having the catenary configuration, i.e. in which the radius of curvature increases continuously from its low point up to a high point in compliance with a known formula that makes use of the hyperbolic cosine function.

Figure 1A:
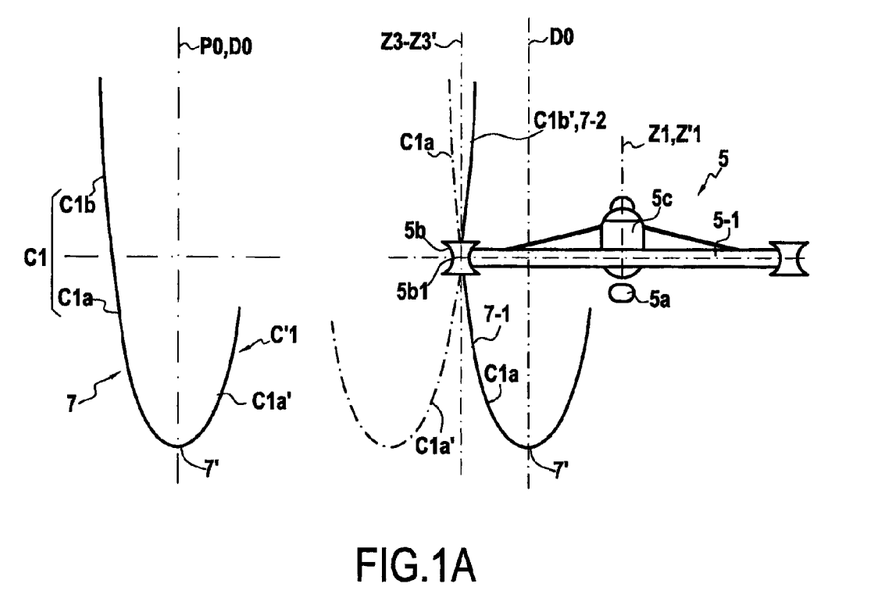
FIG. 1A is a view showing symmetrical and opposite catenary curves respectively above and below guide elements 5b of the guide structure 5.

Below the guide element 5b which it passes, said first flexible hose portion 7-1 adopts a dipping catenary configuration with a low point 7', said dipping catenary being made up of two catenary curves, respectively a descending curve C1a and a rising curve C'1a, which curves are symmetrical about the vertical axis $D_0$ passing through the low point 7', as shown in FIG. 1A.

This type of catenary curve, and in particular of dipping catenary curve, is well known to the person skilled in the art and is described in the prior patents of the Applicant.

FIG. 1A also shows that the top hose portion 7-2 presenting a catenary curve C1b' above the guide element 5b does not continue along the same catenary curve C1a' in the bottom hose portion 7-1 after making contact at 5b1 with the guide element 5b through which it passes, without continuing the same catenary curve C1a' occupied by the bottom hose portion 7-1, the curve portion C1a' being the natural curve that the flexible hose 7-1 would follow below the guide element 5b if its end 7-1' were not brought closer to the top of the tower in order to be fastened thereto. In order to bring the bottom end 7-1' of the pipe portion 7-1 to the top of the tower 4 after it has gone through the guide element 5b at 5b1, the curve C1b' of the flexible hose 7-2 inverses, i.e. it continues with a catenary curve C1a that is substantially symmetrical to the catenary curve portion C1a' relative to the vertical axis $Z_3Z_3'$ of the guide elements 5b at the point of contact 5b1. The curve of the flexible hose 7 is thus subject to quasi-inversion of the direction in which its curvature varies at its point of contact 5b1 with the guide element 5b.

Figure 2:
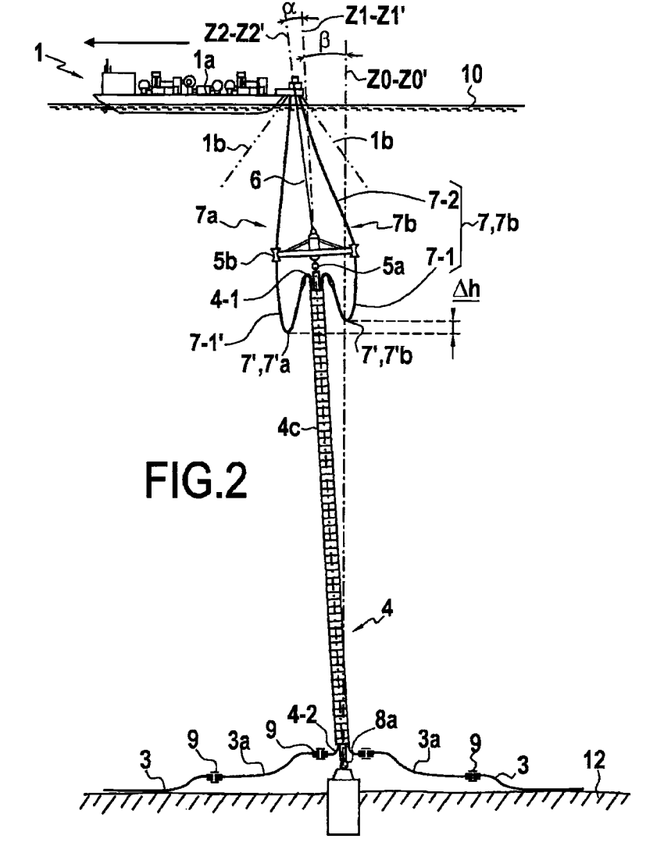
FIG. 2 is a side view similar to that of FIG. 1, in which wind and current have caused the ship to pivot through 180°, the axis $Z_1Z_1'$ of the tower 4 then being inclined at an angle β to the left relative to the vertical axis $Z_0Z'_0$ passing through the base unit.

By acting on the buoyancy of the drum 5c, which is deballasted (pumped out) by known means that are not shown, the stiffness of the tower 4 is increased, i.e. the capacity of the tower to return towards its natural vertical position is increased. Thus, by increasing the buoyancy of the drum 5c, the tendency of the tower to remain vertical is increased even when the FPSO is moved by the swell, wind, and current, e.g. to the left as shown in FIG. 2. In the same manner, by increasing the tension in the cable 6, the tower has a greater tendency to follow the movements of the FPSO more closely, and thus to occupy a position of greater or lesser angle of inclination β depending on the amplitude of the movement of said FPSO.

When the axis $Z_2Z_2'$ of the tensioning cable 6 departs from its vertical position ZZ' as a result of the movement of the FPSO 1, an angle α begins to be created between the cable 6 and the axis $Z_1Z_1'$ of the tower 4. This deforms the two dipping catenaries. The low point 7a' of the dipping catenary portion 7-1 further from the vertical axis $Z_0Z_0'$ of the base unit 8 moves downwards relative to its initial rest position $7a_0'$ when the tower assembly and the guide structure 5 are substantially vertically on the axis of the turret 2. The low inflection point 7b' of the first flexible hose portion 7-1 closer to the axis ZZ' of the base 8 passing through the bottom of the tower 4 rises relative to its initial rest position $7b'_0$ when the tower 4 and the guide structure 5 are vertically on the axis ZZ' of the turret 2. The tensioning of the cable 6 is adjusted in such a manner that the angle α between the axis $Z_2Z_2'$ of the tensioning cable 6 and the axis $Z_1Z_1'$ of the tower 4 does not exceed 5°, the axis $Z_1Z_1'$ of the tower 4 substantially in alignment with the axis of the guide structure not exceeding 5°.

It can be understood that for an identical excursion of the FPSO 1 (for a given value of the angle β), associated essentially with the stiffness of the anchor system 1b, the variation in the height Δh between the bottoms 7a' and 7b' of the dipping catenaries of 7a and 7b is decreased if the angle α decreases and if the tensioning of the cable 6 is increased.

The two flexible hoses 7a-7b slide freely through their respective first guide elements 5b (shown in FIGS. 1 and 2) and they always naturally retain catenary configurations as described above by virtue of said guide elements 5b with which they make contact 5b-1, thus guaranteeing a reserve of flexibility associated with optimum operation of the bottom-to-surface connections.

Figure 3:
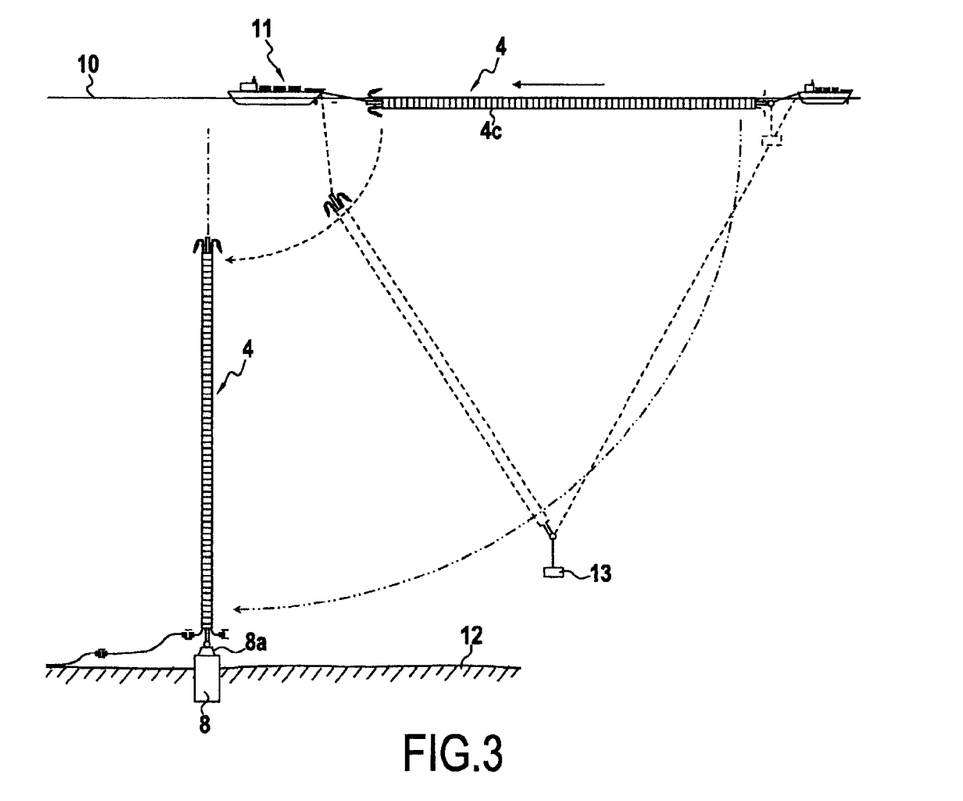
FIG. 3 is a side view showing how a tower 4 is towed to its site, and then up-ended and secured to a base unit 8 resting on the sea bottom 12.
Figure 4:
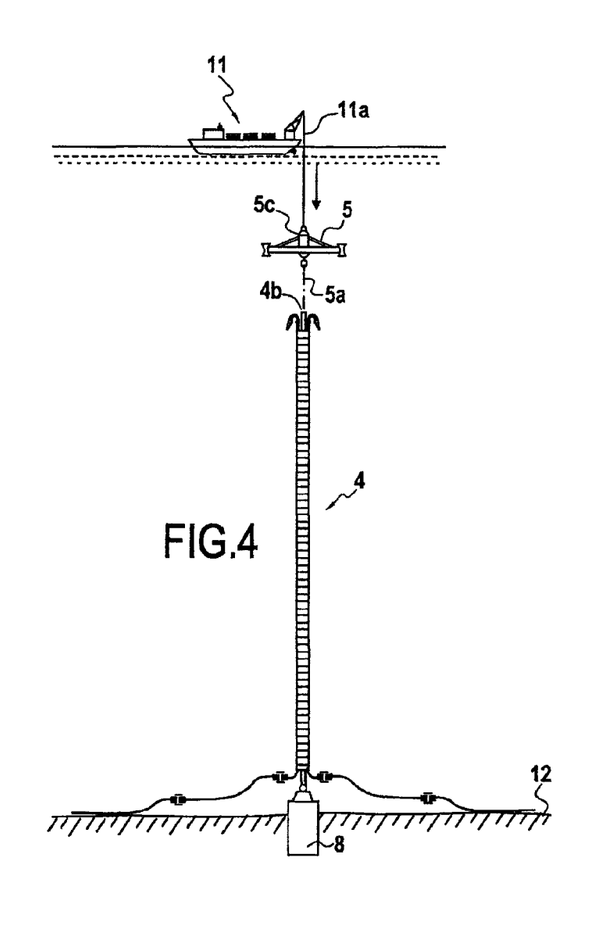
FIG. 4 is a side view of the FIG. 3 tower showing in detail how a guide structure 5 is put into place from a laying ship 11 onto the top of said tower.
Figure 5:
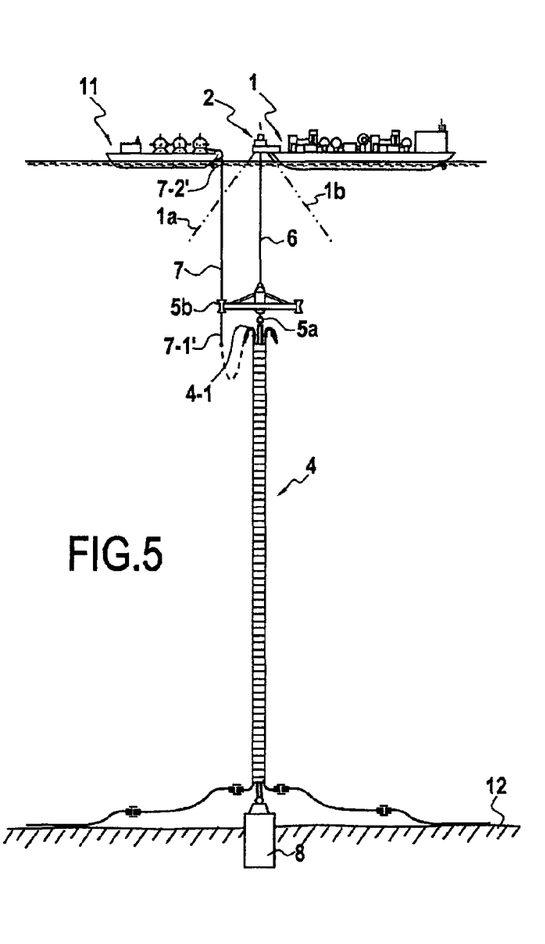
FIG. 5 is a side view similar to FIG. 4 showing the installation of an FPSO that is anchored on a turret cantilevered to its front, a tensioning cable 6 connecting the top of said guide structure 5 to said turret, the figure showing in detail the installation of a connecting hose 7.

FIGS. 3, 4, and 5 show details of various stages when installing the tower on site. Initially, the tower is prefabricated on land in a horizontal position, and it is then towed to its site while still in a horizontal position; it floats because of the set of buoyancy elements 4c distributed along the length of said tower. A deadman 13 is installed at the bottom of the tower, and said tower is up-ended in known manner and connected to the base unit 8 via the flexible mechanical hinge 8a. As a result of its own buoyancy, the tower then remains naturally in a vertical position, as shown in FIG. 3.

An installation ship 11 then lowers the guide structure 5 and connects it to the chain 5a at the top of the tower, as shown in FIG. 4. The drum 5c is then deballasted and the cable 11a via which it was lowered is disconnected. By virtue of its own buoyancy 5c, the guide structure 5 then remains in a substantially vertical position, in the same manner as the tower 4.

The FPSO is then installed by being anchored in position by means of anchor lines 1b, as shown in FIG. 5, and then the tensioning cable 6 is installed that is pre-tensioned by an appropriate amount. All that then remains to be done is to install each of the flexible hoses 7 from a laying ship 11 in known manner, causing each hose to pass through a corresponding guide element 5b, and then connecting its bottom end 7-1' to the end of the swan neck 4-1, and finally transferring the top end 7-2' of said flexible hose 7 to the mooring structure 2c of the turret 2, to end up with the configuration shown in FIG. 1.

Figures 6, 6A, 8, 8A:
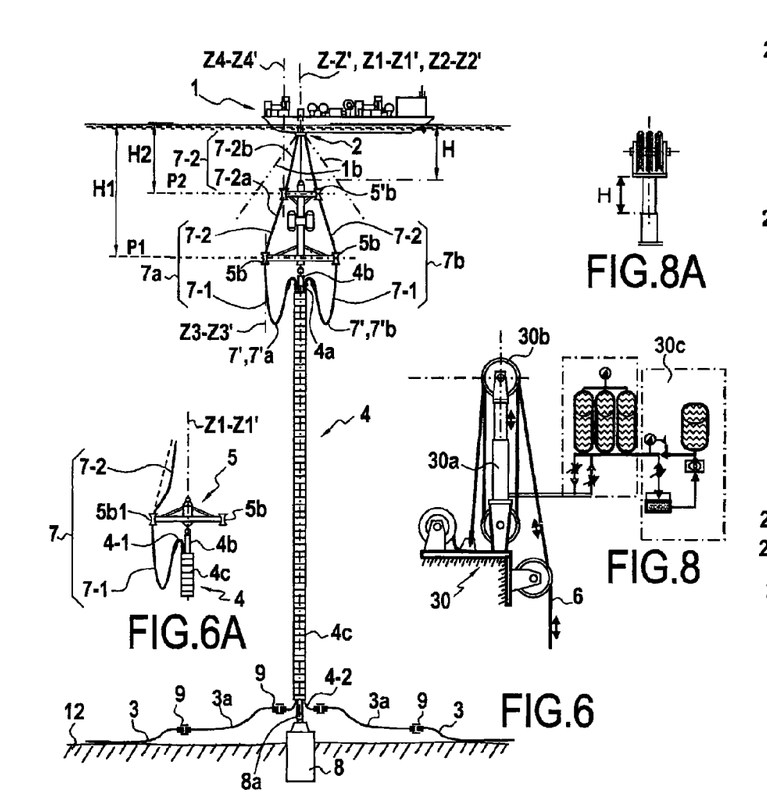
FIG. 6 is a side view of an FPSO anchored on a turret that is internal to said FPSO, the flexible hoses 7 passing from their bottom ends 7-1' at the top of the tower 4 successively through first guide elements 5b, and then through second guide elements 5b' before reaching the turret 2.
FIG. 6A is a side view showing in detail the risk of a flexible hose 7 being damaged by jamming and becoming compressed at the inlet 5b1 where it comes into contact with the guide element 5b through which it passes.
FIG. 8 shows second means for tensioning the cable 6 connected to the top of the tower with the help of a hydraulic tensioner 30 associated with hydraulic accumulators.
FIG. 8A shows in detail the reeving of the tensioning cable 6 at each of the ends of the tensioning actuator of FIG. 8.

FIG. 6 shows a variant of the invention installed on an FPSO that possesses an internal turret situated in the front third portion of the ship 1. The guide structure advantageously presents a first stage of first guide elements 5b situated at a lower first guide plane P1 at a depth H1 and distributed over a circumference of radius R1 lying in the range 5 m to 25 m, and a second stage of second guide elements $5b'$ situated in an upper guide plane P2 situated at a depth H2 between the turret 2 and the first guide plane P1. Said second guide elements $5b'$ are distributed at the periphery of a second stage of the guide structure $5b$, with their axes $Z_4Z_4'$ situated in the same vertical planes as the axes $Z_3Z_3'$ of the first guide element. Thus, a flexible hose 7 passes via two guide elements $5b'$ and $5b$ that lie in a common plane containing said axes $Z_3Z_3'$, $Z_4Z_4'$, and also the axis $Z_1Z_1'$ of the guide structure 5, such that the catenary curves of the various portions 7-1, 7-2a, 7-2b are all situated substantially in a common vertical plane. A first fraction 7-2a of the second pipe portion 7-2 is situated between a first guide element $5b$ and a second guide element $5b'$, while the second fraction 7-2b thereof is situated between the second guide element $5b'$ and the top end 7-2' of the flexible hose 7.

In practice, the guide structure $5b$ is installed while sheltered from the effects of swell and the depth H2 of the upper stage P2 of guide elements $5b'$ should lie in the range 40 m to 200 m, and the depth H1 of the deeper first stage of the first guide element $5b$ is situated at a depth H1 lying in the range 45 m to 250 m.

This configuration presents the advantage of considerably improving the guidance of each of the flexible hoses 7, thus avoiding any risk of the flexible hoses being damaged by the jamming of a hose that is excessively curved at its point of contact $5b$-1 in a guide element $5b$, which phenomenon is particularly to be feared in the event of a storm or of severe weather and sea conditions. FIG. 6A shows such jamming that is to be feared mainly in the first guide plane P1. Such a jamming configuration at the inlet of the guide element puts the flexible hose 7 locally into axial compression at the level $5b$-1 of the first guide element $5b$, which is harmful to the integrity of the flexible hose under pressure and runs the risk of causing it to burst and thus be lost together with a considerable amount of pollution.

FIG. 7A is a cut-away section view of a first way of tensioning the cable 6, described with reference to the internal turret of FIG. 6. Said cable 6 enters into the turret 2, preferably on the axis of said turret, and it is guided by a fairlead or by wheels 20. It is bent over a pulley device 21 that is secured at 22 to the structure of said turret, and it then has its end connected to a counterweight 23 that moves along a vertical axis parallel to the axis ZZ' in a guide well (not shown) forming part of said turret. These means present the advantage of being very simple and of requiring only minimum maintenance. In contrast, in order to change the value of the tension, it is necessary to modify the weight of said counterweight, either by adding or removing weights thereto, or else by filling/emptying a tank, e.g. merely by using sea water, said tank being secured to said counterweight. Another advantage of this arrangement is that the cable, the counterweight, and the turret remain in a position that is substantially stationary in terms of rotation relative to the sea bottom 3. In contrast, this arrangement requires a large amount of clearance for the counterweight, which does not raise any difficulty for an integrated turret of the kind described with reference to FIG. 6. This arrangement is generally not suitable for an external turret because of the small height of the overall structure.

FIG. 7B is a section view of a second way of tensioning the cable 6 with reference to the internal turret of FIG. 6. Said cable 6 enters the turret 2, preferably on the axis of said turret and it is guided by a fairlead or by wheels 20. It passes right through the turret and the swivel joint coupling $2b$ to which the flexible hoses 14 are connected, exiting above the deck 1a of the FPSO, and it is then bent over a pulley device 24a-24b secured to the structure of the deck 1a of the FPSO, and then its end is connected to a counterweight 23 that moves along a vertical axis parallel to the axis ZZ' in a guide well 25 incorporated in the hull of the FPSO. These means likewise present the advantage of being very simple and of requiring only minimum maintenance. However, in order to change the value of the tension, it is appropriate to modify the weight of said counterweight 23, either by adding/removing weights, or else by filling/emptying a tank, e.g. merely by using sea water, said tank being secured to said counterweight.

Because the cable 6 connected to the top of the tower 4 is substantially stationary in rotation relative to the sea bottom, and because the counterweight 23 that is secured to the ship 1 is caused to move in relative rotation therewith relative to the portion of the cable inside the turret 2, a swivel connection $6b$ is advantageously arranged on the path of the cable, preferably inside the turret 2, e.g. halfway up the turret, so that the bottom portion $6c$ of the cable 6 remains substantially stationary in rotation relative to the sea bottom without any twisting, while the top portion $6a$ of said tensioning cable 6 above the swivel connection $6b$ follows the movement of the FPSO without twisting the cable, regardless of the number of revolutions the ship might make about the vertical axis ZZ'. This arrangement is applicable for an incorporated turret as described with reference to FIG. 6 and also for a turret cantilevered out from the front, as described with reference to FIG. 1. With a cantilevered-out turret, the swivel connection $6b$ is preferably installed between the pulley $24a$ and the end wall $2c$-1 of the turret. However, under certain circumstances, the swivel connection $6b$ will not have enough vertical clearance in the event of extreme movements of the FPSO. Under such circumstances, the swivel connection $6b$ should be installed either in the water at a good distance below the turret, or else in a horizontal axial position between the pulleys $24a$ and $24b$.

FIG. 8 shows a third way of tensioning the cable 6 based on using a hydraulic tensioner 30 that is secured to the turret 2 or to the deck 1a of the FPSO. This type of tensioner is known to the person skilled in the art and is constituted by a single-acting hydraulic actuator $30a$ provided at both ends with respective reevings $30b$ of pulleys, the cable 6 passing in known manner around said pulleys with its end being connected to a stationary point secured to the support of said actuator. A hydraulic unit $30c$ made up of accumulators and of pumps maintains a substantially constant given pressure in the actuator $30a$ and thus a substantially constant given tension in the cable 6, regardless of the length of cable that is wound in or wound out. Tensioning in this way is more complex than using a counterweight, however it presents the advantage of being capable of being adjusted in real time, merely by changing the setpoint pressure within the accumulators, thus obtaining a great advantage in the event of severe weather and sea conditions, possibly requiring the stiffness of the tower to be adjusted finely in order to minimize the stresses inflicted on the connecting hoses that remain the weak elements in this type of bottom-to-surface connection.

FIG. 10 shows an embodiment in which the buoyancy element $4c$ of the tower 4 are constituted by buoyancy and guide modules $4c_i$ that slide along the vertical tension leg $4b$ and the risers $4a$, the risers being secured at their top ends to a carrier structure $4b1$ and being symmetrically distributed around the vertical tension leg $4b$. Said buoyancy and guide modules $4c_i$ also co-operate in sliding with the risers $4a$ and the vertical tension leg $4b$ so as to keep the risers distributed uniformly and regularly around the vertical tension leg $4b$.

The invention claimed is:

1. A bottom-to-surface connection installation between a plurality of undersea pipes resting on a sea bottom and a floating support at a sea surface and anchored to said sea bottom, the installation comprising:
   a) said floating support including a turret having a cavity within a structure offset at a front of the floating support or incorporated in or beneath a hull of the floating support, said cavity passing through the hull of the floating support over an entire height of the hull, said turret further including a cylindrical internal portion suitable for remaining substantially stationary relative to the sea bottom inside said cavity when said floating support is caused to turn about a vertical axis of said internal portion or of said cylindrical cavity of the turret, said floating support being anchored to the sea bottom via lines that are fastened at their top ends to said cylindrical internal portion of the turret; and
   b) a plurality of flexible hoses extending from said turret to the top ends of respective ones of a plurality of rigid pipes to which bottom ends of said flexible hoses are connected, the tops ends of said flexible hoses being connected to the turret, said rigid pipes providing connections between said flexible hoses and respective ones of said plurality of undersea pipes resting on the sea bottom, said rigid pipes being connected to one another and/or guided at least at the tops of said rigid pipes by a carrier structure that is tensioned by buoyancy elements, said carrier structure being connected to a base unit resting on or embedded in the sea bottom;
   wherein said installation includes a guide structure maintained in the subsurface between said turret and said carrier structure, secured to said carrier structure at the top of said rigid pipes, said guide structure being suitable for guiding said flexible hoses between the top ends of the flexible hoses connected to said cylindrical internal portion of the turret and the bottom ends of the flexible hoses connected to the top ends of said rigid pipes, said guide structure having a plurality of first guide elements having respective ones of said plurality of flexible hoses passing respectively therethrough in such a manner that each said flexible hose has at least a first flexible hose portion in a dipping catenary configuration with a low point of inflection intermediate between the bottom end of said flexible hoses connected to the top end of said rigid pipe and the point of contact between said flexible hose and said first guide element through which said flexible hose passes, and a second flexible hose portion extending entirely above said point of contact of said flexible hose with said first guide element, following a catenary-shaped curve from said guide element through which said second flexible hose passes to said turret to which the top end of the second flexible hose is connected.

2. The installation according to claim 1, wherein said guide structure has at least four of said first guide elements that are distributed, at the periphery of said guide structure, said guide elements having axes situated at a distance of at least 3 m from the axis of said guide structure.

3. The installation according to claim 1, wherein said guide structure includes at least one buoyancy element suitable for keeping said guide structure above said carrier structure of the rigid pipes, at a depth of at least 25 m from the surface.

4. The installation according to claim 1, wherein said buoyancy element is constituted by at least one drum for which it is possible to vary its tensioning force by ballasting or deballasting said drum.

5. The installation according to claim 1, wherein said guide structure is connected to said carrier structure by a connection constituting a flexible mechanical hinge between said guide structure and said carrier structure.

6. The installation according to claim 1, wherein said guide structure includes at least one first stage of said first guide elements situated at a depth and at least one second stage of second guide elements situated above said first guide elements at a depth less than the depth of said first guide elements, and through which said second flexible hose portions pass, an axis of each said second guide element being positioned substantially in a same vertical plane as an axis of said first guide element above which said second guide element is situated and through which the same flexible hose passes, but at a distance closer to an axis of said guide structure than said axis of said first guide element.

7. The installation according to claim 1, wherein said guide structure is connected to said turret by at least one connection and tensioning cable.

8. The installation according to claim 7, wherein said tensioning cable is tensioned in such a manner that an angle α between an axis of said tensioning cable and an axis of said carrier structure, remains less than 5°, said floating support being anchored to the sea bottom in such a manner that an angle of inclination β between the axis of said carrier structure, and a vertical passing through said base unit remains less than 10° when the floating support is moved by water and/or wind force in spite of being anchored.

9. The installation according to claim 7, wherein said tensioning cable passes through said turret, and is then bent over pulleys secured to said turret and/or to a structure of the floating support, prior to being tensioned at its free end by a counterweight moving parallel to an axis ZZ' of said turret in a guide wall inside said turret or respectively inside the hull of said floating support.

10. The installation according to claim 7, wherein said cable is tensioned using a hydraulic tensioner secured to the turret or to a deck of the floating support, said hydraulic tensioner including at least one hydraulic actuator co-operating with a reeving of pulleys, an end of said tensioning cable being fastened to a stationary point secured to a support of said hydraulic actuator, and a hydraulic unit constituted by accumulators and pumps suitable for maintaining a substantially constant given pressure in said actuator enabling a substantially constant given tension to be imparted to said tensioning cable.

11. The installation according to claim 7, wherein said tensioning cable co-operates with a swivel connection on a path of the cable, in such a manner that a bottom portion of the cable beneath said swivel connection remains without twisting, while a top portion of said tensioning cable follows relative turning movements of said floating support about said internal cylindrical portion of the turret.

12. The installation according to claim 1, including a mooring structure fastened to an underface of a bottom wall of said cylindrical internal portion of the turret, said flexible hoses being moored to said mooring structure at their said top ends and said floating support being anchored to the sea bottom by anchor lines moored to said mooring structure, a plurality of second connection pipes extending through said turret between the top ends of said flexible hoses and a deck of the floating support, passing through a bottom wall of the cylindrical internal portion of the turret and rising to a coupling having said second connection pipes connected thereto, said coupling being secured to the floating support.

13. The installation according to claim 1, including a multi riser hybrid tower comprising:
   a) a vertical tension leg suspended from at least one float immersed in the subsurface, said tension leg being fastened at a bottom end to a base unit resting on the sea bottom and/or embedded in the sea bottom; and
   b) said plurality of rigid pipes comprising rigid vertical pipes, having bottom ends connected via junction bend pipe elements and automatic connectors to a plurality of said pipes resting on the sea bottom; and
   a plurality of buoyancy and guide modules supported by said tension leg, said buoyancy and guide modules supporting said buoyancy elements and guiding said rigid vertical pipes in position around said tension leg, said buoyancy and guide modules constituting a plurality of independent structures suitable for sliding along said tension leg and along said rigid vertical pipes, said structure supporting buoyancy elements and guiding said rigid vertical pipes in position around said tension leg.

14. The installation according to claim 1, wherein said carrier structure comprises a vertical tension leg connected to said base unit via a flexible mechanical hinge.

15. A method of towing a tower at sea and putting into place the installation according to claim 13, wherein the method comprises the following successive steps:
   1) prefabricating said tower on land;
   2) towing said tower at sea while in a horizontal position and using a laying ship, said tower floating at the surface because of said buoyancy elements distributed along said tower;
   3) installing a deadman at the bottom end of said tower;
   4) up-ending said tower and connecting its bottom end to said flexible mechanical hinge at said base unit;
   5) lowering said guide structure from the laying ship and connecting said guide structure to the top of said tower;
   6) deballasting a buoyancy drum of said guide structure and then disconnecting the cable for lowering said guide structure, such that said guide structure then remains as a result of buoyancy in a position substantially vertically above said tower;
   7) moving away the laying ship and moving the floating support on the surface until said floating support comes up to said guide structure, and then anchoring the floating support to the sea bottom using anchor lines;
   8) installing a connection and tensioning cable between the floating support and the guide structure, and tensioning said cable to maintain said guide structure and said tower that is connected thereto in a configuration that is sufficiently stiff to enable said flexible hoses to be subsequently put into place;
   9) bringing up the laying ship and lowering each bottom end of flexible hose in register with and through a respective one of said guide elements, and then connecting the bottom ends of the flexible hoses to the top ends of corresponding ones of said rigid vertical pipes; and then
   10) connecting the bottom ends of the rigid vertical pipes with the ends of the pipes resting on the sea bottom.

* * * * *